(12) United States Patent
Zhu et al.

(10) Patent No.: US 7,825,049 B2
(45) Date of Patent: *Nov. 2, 2010

(54) THERMAL PERFORMANCE GARMENTS COMPRISING A BLEACH TOLERANT OUTER SHELL FABRIC OF POLYPYRIDOBISIMIDAZOLE AND POLYBENZOBISOXAZOLE FIBERS

(75) Inventors: Reiyao H. Zhu, Midlothian, VA (US); Richard Young, Richmond, VA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 132 days.

This patent is subject to a terminal disclaimer.

(21) Appl. No.: 12/084,504

(22) PCT Filed: Dec. 13, 2006

(86) PCT No.: PCT/US2006/061986

§ 371 (c)(1),
(2), (4) Date: May 1, 2008

(87) PCT Pub. No.: WO2007/076263

PCT Pub. Date: Jul. 5, 2007

(65) Prior Publication Data

US 2009/0260138 A1    Oct. 22, 2009

Related U.S. Application Data

(60) Provisional application No. 60/751,023, filed on Dec. 16, 2005.

(51) Int. Cl.
*D03D 15/00* (2006.01)
(52) U.S. Cl. .............. 442/301; 442/314; 428/359; 428/364; 428/920; 428/921
(58) Field of Classification Search .......... 428/359, 428/364, 920, 921; 442/301, 414
See application file for complete search history.

*Primary Examiner*—Ula C Ruddock

(57) ABSTRACT

The invention concerns a flame-resistant garment having an outer shell fabric comprising 50 to 95 parts by weight of a polybenzobisoxazole fiber and 5 to 50 parts by weight of a polypridobisimidazole fiber having an inherent viscosity of greater than 20 dl/g.

20 Claims, No Drawings

THERMAL PERFORMANCE GARMENTS COMPRISING A BLEACH TOLERANT OUTER SHELL FABRIC OF POLYPYRIDOBISIMIDAZOLE AND POLYBENZOBISOXAZOLE FIBERS

CROSS REFERENCE TO RELATED APPLICATIONS

This application claims benefit of U.S. Application No. 60/751,023 filed Dec. 16, 2005, the disclosure of which is incorporated herein by reference.

FIELD OF THE INVENTION

The invention concerns mixtures of polypridobisimidazole fibers with polybenzobisoxazole fibers, and to fabrics and articles made therefrom.

BACKGROUND OF THE INVENTION

Polypyridobisimidazole polymer is a rigid rod polymer. Fiber made from this polymer, one polymer composition of which is referred to as PIPD and known as the polymer used to make M5® fiber, is known to be useful in both cut and flame resistant protective apparel. See, for example, PCT Application WO199902169 and WO2005002376. Fibers made from rigid-rod polymers having strong hydrogen bonds between polymer chains, e.g., polypyridobisimidazoles, have been described in U.S. Pat. No. 5,674,969 to Sikkema et al. An example of a polypyridobisimidazole includes poly(1,4-(2,5-dihydroxy)phenylene-2,6-pyrido[2,3-d:5,6-d']bisimidazole), which can be prepared by the condensation polymerization of tetraaminopyridine and 2,5-dihydroxyterephthalic acid in polyphosphoric acid. Sikkema describes that in making one- or two-dimensional objects, such as fibers, films, tapes, and the like, it is desired that polypyridobisimidazoles have a high molecular weight corresponding to a relative viscosity ("$V_{rel}$" or "$\eta_{rel}$") of at least about 3.5, preferably at least about 5, and more particularly equal to or higher than about 10, when measured at a polymer concentration of 0.25 g/dl in methane sulfonic acid at 25° C. Sikkema also discloses that good fiber spinning results are obtained with poly[pyridobisimidazole-2,6-diyl(2,5-dihydroxy-p-phenylene)] having relative viscosities greater than about 12, and that relative viscosities of over 50 (corresponding to inherent viscosities greater than about 15.6 dl/g) can be achieved.

The use of polybenzobisoxiazole (PBO) fiber and polybisimidazole in cut resistant, spike resistant or ballistic resistant fiber has been reported. See, generally, U.S. Patent Application No. 2005/0003727, PCT Patent Application Nos. WO2005002376, WO2004018754, and WO2005/001373.

U.S. Patent Application No. 2003/0228812 discloses the use of polybenzimidazole (PBI) and PBO fibers in protective apparel. PCT Patent Application No. WO2004023909 discloses the use of polybenzimidazole and poly(paraphephenylene benzobisaxazole) fibers and filaments in fabrics. A number of patent and patent applications report blends of aramid fiber with PBO fiber. See U.S. Patent Application Nos. 2005/0065146, 2003/0228821, and 2003/0203690, and U.S. Pat. Nos. 5,233,821, 6,624,096, and 6,914,022. In addition, polybenzimidazole fiber is currently blended with aramids in commercially available fabrics. The aforementioned polybenzimidazoles are polybibenzimidazole compositions, which are not rigid rod polymers. Therefore the fiber made from that polymer has low fiber strength.

Thermal and flame retardant protective apparel has been used by firefighters, emergency response personnel, members of the military and racing personnel as well as industrial workers to save lives and reduce injury due to fires and other thermal events. While polypyridobisimidazole fiber has excellent fire resistant properties, superior in many respects to most other fibers, it does not tolerate chlorine bleach very well. Bleach tolerance is especially desired for disinfecting protective garments against biohazard exposure, and bleach is the most widely recommended disinfecting agent for first responder type garments. There is, however, a desire to incorporate the superior fire resistance of polypyridobisimidazole fibers into fabrics to take advantage of their superior flame resistant properties. Thus, there is a need for a fabric containing polypyridobisimidazole that can tolerate some exposure to bleach.

SUMMARY OF THE INVENTION

In one aspect, the invention concerns flame-resistant garment comprising 5 to 50 parts by weight of a polypyridobisimidazole fiber having an inherent viscosity of greater than 20 dl/g and 50 to 95 parts by weight of a polybenzobisoxazole fiber. In some embodiments, the polypyridobisimidazole fiber has an inherent viscosity of greater than 25 dl/g. In other embodiments, the polypyridobisimidazole fiber has an inherent viscosity of greater than 28 dl/g.

In some embodiments, the garment comprises 5 to 25 parts by weight of a polypyridobisimidazole fiber, and 75 to 95 parts by weight of a polybenzobisoxazole fiber. In yet other embodiments, the garment comprises 5 to 25 parts by weight of a polypridobisimidazole fiber and 75 to 95 parts by weight of a polybenzobisoxazole fiber.

In certain embodiments, the polypyridobisimidazole and polybenzobisoxazole fibers are present as staple fibers. In other embodiments, the polypyridobisimidazole and polybenzobisoxazole fibers are present as continuous filaments.

One useful polypyridobisimidazole is poly[2,6-diimidazo [4,5-b:4,5-e]-pyridinylene-1,4(2,5-dihydroxy)phenylene).

Polybenzobisoxazole fibers include those made from a polymer having units of one or more of the following formulas:

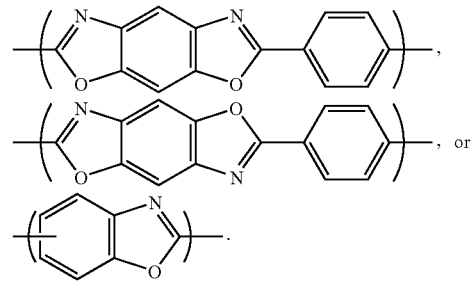

In certain embodiments, the invention concerns a flame-resistant garment comprising in order:

a) an inner thermal lining, b) a liquid barrier, and c) an outer shell fabric, the outer shell fabric comprising:

5 to 50 parts by weight of a polypyridobisimidazole fiber having an inherent viscosity of greater than 20 dl/g and 50 to 95 parts by weight of a polybenzobisoxazole fiber.

Also provided is a method of producing a flame-resistant garment having an inner thermal lining, a liquid barrier, and an outer shell fabric, by incorporating into the garment an outer shell fabric comprising
5 to 50 parts by weight of a polypyridobisimidazole fiber having an inherent viscosity of greater than 20 dl/g and
50 to 95 parts by weight of a polybenzobisoxazole fiber

DETAILED DESCRIPTION OF ILLUSTRATIVE EMBODIMENTS

The present invention may be understood more readily by reference to the following detailed description of illustrative and preferred embodiments that form a part of this disclosure. It is to be understood that the scope of the claims is not limited to the specific devices, methods, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

In one embodiment, the invention relates to a flame-resistant garment having an outer shell fabric comprising 5 to 55 parts by weight of a polypyridobisimidazole fiber having an inherent viscosity of greater than 20 dl/g and 50 to 95 parts by weight of a polybenzobisoxazole fiber. This invention also relates to a flame-resistant garment comprising, in order, an inner thermal lining, a liquid barrier, and an outer shell fabric; the outer shell fabric comprising 5 to 50 parts by weight of a polypyridobisimidazole fiber having an inherent viscosity of greater than 20 dl/g and 50 to 95 parts by weight of a polybenzobisoxazole fiber.

For purposes herein, the term "fiber" is defined as a relatively flexible, macroscopically homogeneous body having a high ratio of length to width across its cross-sectional area perpendicular to its length. The fiber cross section can be any shape, but is typically round. Herein, the term "filament" or "continuous filament" is used interchangeably with the term "fiber."

As used herein, the term "staple fibers" refers to fibers that are cut to a desired length or are stretch broken, or fibers that occur naturally with or naturally have a low ratio of length to width across its cross-sectional area perpendicular to its length when compared with filaments. Length can vary from about 0.1 inch to several feet. In some embodiments, the length is from 0.1 inch to about 8 inches. Man made staple fibers are cut to a length suitable for processing on cotton, woolen, or worsted yarn spinning equipment.

The staple fibers can have (a) substantially uniform length, (b) variable or random length, or (c) subsets of the staple fibers have substantially uniform length and the staple fibers in the other subsets have different lengths, with the staple fibers in the subsets mixed together forming a substantially uniform distribution.

In some embodiments, suitable staple fibers have a length of 1 to 30 centimeters. Staple fibers made by short staple processes result in a fiber length of 1 to 6 centimeters.

The staple fibers can be made by any process. The staple fibers can formed by stretch breaking continuous fibers resulting in staple fibers with deformed sections that act as crimps. The staple fibers can be cut from continuous straight fibers using a rotary cutter or a guillotine cutter resulting in straight (i.e., non crimped) staple fiber, or additionally cut from crimped continuous fibers having a saw tooth shaped crimp along the length of the staple fiber, with a crimp (or repeating bend) frequency of no more than 8 crimps per centimeter.

Stretch broken staple fibers can be made by breaking a tow or a bundle of continuous filaments during a stretch break operation having one or more break zones that are a prescribed distance creating a random variable mass of fibers having an average cut length controlled by break zone adjustment.

Staple fibers of this invention can be converted into yarns using traditional long and short staple ring spinning processes which are well known in the art. For short staple, cotton system spinning fiber lengths from ¾ inch to 2¼ inch (i.e., 1.9 to 5.7 cm.) are typically used. For long staple, worsted or woolen system spinning, fibers up to 6½ inches (i.e., 16.5 cm.) are typically used. However, this is not intended to be limiting to ring spinning because the yarns may also be spun using air jet spinning, open end spinning, and many other types of spinning which converts staple fiber into useable yarns.

The stretch broken staple fibers typically have length of up to 7 inches (i.e., 17.8 cm.) long and can be made using traditional stretch-broken tow to top staple processes. Staple fibers having maximum lengths of up to around 20 inches (i.e., 51 cm) are possible through processes as described for example in PCT Patent Application No. WO 0077283. Yarns can be made by consolidating fibers into spun yarn using filament entanglement with air jets having a tenacity in the range of 3 to 7 grams per decitex. These yarns may have secondary twist, that is, they may be twisted after formation to impart more tenacity to the yarn, in which case the tenacity can be in the 10 to 18 grams per denier (i.e., 9 to 17 grams per dtex) range. Stretch broken staple fibers normally do not require crimp because the stretch-breaking process imparts a degree of crimp into the fiber.

The term continuous filament refers to a flexible fiber having relatively small-diameter and whose length is longer than those indicated for staple fibers. Continuous filament fibers and multifilament yarns of continuous filaments can be made by processes well known to those skilled in the art.

Fabrics of this invention can take on numerous configurations, including, but not limited to, knitted or woven fabrics or non-woven structures. Such fabric configurations are well known to those skilled in the art.

By "non-woven" fabric is meant a network of fibers, including unidirectional (if contained within a matrix resin), felt, fiber batts, and the like.

By "woven" fabric is meant a fabric woven using any fabric weave, such as plain weave, crowfoot weave, basket weave, satin weave, twill weave, and the like. Plain and twill weaves are believed to be the most common weaves used in the trade.

The instant invention utilizes polypyridobisimidazole fiber. This fiber is a rigid rod polymer that is of high strength. The polypyridobisimidazole fiber has an inherent viscosity of at least 20 dl/g or at least 25 dl/g or at least 28 dl/g. Such fibers include PIPD fiber (also known as M5® fiber and fiber made from poly[2,6-diimidazo[4,5-b:4,5-e]-pyridinylene-1,4(2,5-dihydroxy)phenylene). PIPD fiber is based on the structure:

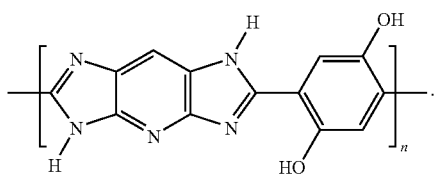

Polypyridobisimidazole fiber can be distinguished from the well known commercially available PBI fiber or polybenzimidazole fiber in that that polybenzimidazole fiber is a polybibenzimidazole. Polybibenzimidazole fiber is not a rigid rod polymer and has low fiber strength and low tensile modulus when compared to polypyridobisimidazoles.

PIPD fibers have been reported to have the potential to have an average modulus of about 310 GPa (2100 grams/denier) and an average tenacities of up to about 5.8 Gpa (39.6 grams/denier). These fibers have been described by Brew, et al., *Composites Science and Technology* 1999, 59, 1109, Van der Jagt and Beukers, *Polymer* 1999, 40, 1035; Sikkema, *Polymer* 1998, 39, 5981; Klop and Lammers, *Polymer*, 1998, 39, 5987; Hageman, et al., *Polymer* 1999, 40, 1313.

One method of making rigid rod polypyridoimidazole polymer is disclosed in detail in U.S. Pat. No. 5,674,969 to Sikkema et al. Polypyridoimidazole polymer may be made by reacting a mix of dry ingredients with a polyphosphoric acid (PPA) solution. The dry ingredients may comprise pyridobisimidazole-forming monomers and metal powders. The polypyridobisimidazole polymer used to make the rigid rod fibers used in the fabrics of this invention should have at least 25 and preferably at least 100 repetitive units.

For the purposes of this invention, the relative molecular weights of the polypyridoimidazole polymers are suitably characterized by diluting the polymer products with a suitable solvent, such as methane sulfonic acid, to a polymer concentration of 0.05 g/dl, and measuring one or more dilute solution viscosity values at 30° C. Molecular weight development of polypyridoimidazole polymers of the present invention is suitably monitored by, and correlated to, one or more dilute solution viscosity measurements. Accordingly, dilute solution measurements of the relative viscosity ("$V_{rel}$" or "$\eta_{rel}$" or "$\eta_{rel}$") and inherent viscosity ("$V_{inh}$" or "$\eta_{inh}$" or "$n_{inh}$") are typically used for monitoring polymer molecular weight. The relative and inherent viscosities of dilute polymer solutions are related according to the expression $$V_{inh} = \ln(V_{rel})/C,$$

where ln is the natural logarithm function and C is the concentration of the polymer solution. $V_{rel}$ is a unitless ratio of the polymer solution viscosity to that of the solvent free of polymer, thus $V_{inh}$ is expressed in units of inverse concentration, typically as deciliters per gram ("dl/g"). Accordingly, in certain aspects of the present invention the polypyridoimidazole polymers are produced that are characterized as providing a polymer solution having an inherent viscosity of at least about 20 dl/g at 30° C. at a polymer concentration of 0.05 g/dl in methane sulfonic acid. Because the higher molecular weight polymers that result from the invention disclosed herein give rise to viscous polymer solutions, a concentration of about 0.05 g/dl polymer in methane sulfonic acid is useful for measuring inherent viscosities in a reasonable amount of time.

Exemplary pyridobisimidazole-forming monomers useful in this invention include 2,3,5,6-tetraaminopyridine and a variety of acids, including terephthalic acid, bis-(4-benzoic acid), oxy-bis-(4-benzoic acid), 2,5-dihydroxyterephthalic acid, isophthalic acid, 2,5-pyridodicarboxylic acid, 2,6-napthalenedicarboxylic acid, 2,6-quinolinedicarboxylic acid, or any combination thereof. Preferably, the pyridobisimidazole forming monomers include 2,3,5,6-tetraaminopyridine and 2,5-dihydroxyterephthalic acid. In certain embodiments, it is preferred that that the pyridoimidazole-forming monomers are phosphorylated. Preferably, phosphorylated pyridoimidazole-forming monomers are polymerized in the presence of polyphosphoric acid and a metal catalyst.

Metal powders can be employed to help build the molecular weight of the final polymer. The metal powders typically include iron powder, tin powder, vanadium powder, chromium powder, and any combination thereof.

The pyridobisimidazole-forming monomers and metal powders are mixed and then the mixture is reacted with polyphosphoric acid to form a polypyridoimidazole polymer solution. Additional polyphosphoric acid can be added to the polymer solution if desired. The polymer solution is typically extruded or spun through a die or spinneret to prepare or spin the filament.

Polybenzobisoxazole (PBO) is described in PCT Application No. WO 93/20400, the disclosure of which is incorporated herein by reference. Polybenzobisoxazole are preferably made up of repetitive units of the following structures:

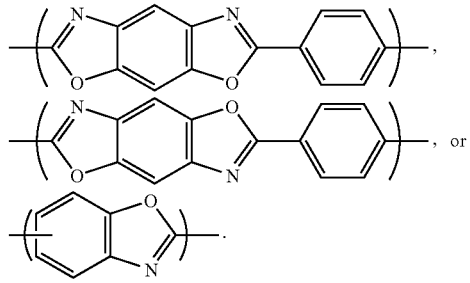

While the group shown in the main chain of the bis-azoles is the preferred para-phenylene group, that group may be replaced by any divalent organic group which doesn't interfere with preparation of the polymer, or no group at all. For example, that group may be aliphatic up to twelve carbon atoms, tolylene, biphenylene, bis-phenylene ether, and the like.

The polybenzobisoxazole used to make fibers of this invention should have at least 25 and preferably at least 100 repetitive units. Preparation of the polymers and spinning of those polymers is disclosed in the aforementioned PCT application WO 93/20400

As illustration of some particularly useful embodiments of this invention, the flame-resistant garment can have essentially one layer, which is the outer shell fabric, for such things as jumpsuits for fire fighters or for military personnel. Such suits are typically used over the firefighters clothing and can be used to parachute into an area to fight a forest fire.

In other embodiments of this invention the flame-resistant garment is as multilayer garment having a general construction such as disclosed in U.S. Pat. No. 5,468,537, which is incorporated by reference. Such garments generally have three layers or three types of fabric constructions, each layer or fabric construction performing a distinct function. There is an outer shell fabric that provides flame protection and serves as a primary defense from flames for the fire fighter. Adjacent the outer shell is a moisture barrier that is typically a liquid barrier but can be selected such that it allows moisture vapor to past through the barrier. Laminates of Gore-Tex® PTFE membrane or Neoprene® membranes on a fibrous nonwoven or woven meta-aramid scrim fabric are moisture barriers typically used in such constructions. Adjacent the moisture barrier is a thermal liner, which generally includes a batt of heat resistant fiber attached to an internal face cloth. The moisture barrier keeps the thermal liner dry and thermal liner protects the wearer from heat stress from the fire or heat threat being addressed by the wearer.

The outer shell fabric of the garments of this invention have 5 to 50 parts by weight of a polypyridobisimidazole fiber and 50 to 95 parts by weight of a polybenzobisoxazole fiber, based on 100 parts by weight of the two fibers. This compositional range is believed to provide the best combination of properties from both fibers. In some preferred embodiments, the compositional range of the outer shell fabric of the garments of this invention have 5 to 25 parts by weight of a polypyridobisimidazole fiber and 75 to 95 parts by weight of an polybenzobisoxazole fiber, based on 100 parts by weight of the two fibers.

The garments of this invention have improved outer fabrics. Polypyridobisimidazole yarns typically do not tolerate exposure to chlorine bleach very well because of the high oxidative nature of the bleach. On the other hand, polybenzobisoxazole fiber is very tolerant of exposure to bleach. When an excess of polybenzobisoxazole fiber is used with the polypyridobisimidazole fiber in the outer fabric, and the two fibers are uniformly distributed in the fabric, the combination ensures the resulting flame-retardant fabric not only has higher-strength than the prior art outer fabrics that are made form the combination of polyparaphenylene terephthalamide and polybibenzimidazole fibers, but also the garment will certainly remain integrated after casual exposure to bleach that would otherwise disintegrate a garment made solely from polypyridobisimidazole fiber.

In a preferred embodiment of this invention the outer shell fabric is woven. The fibers can be incorporated into the outer shell fabric using staple fibers yarns of an intimate blend of fibers. By "intimate blend", it is meant the various staple fibers in the blend form a relatively uniform mixture of the fibers. If desired, other staple fibers can be combined in this relatively uniform mixture of staple fibers. The blending can be achieved by any number of ways known in the art, including processes that creel a number of bobbins of continuous filaments and concurrently cut the two or more types of filaments to form a blend of cut staple fibers; or processes that involve opening bales of different staple fibers and then opening and blending the various fibers in openers, blenders, and cards; or processes that form slivers of various staple fibers which are then further processed to form a mixture, such as in a card to form a sliver of a mixture of fibers. Other processes of making an intimate fiber blend are possible as long as the various types of different fibers are relatively uniformly distributed throughout the blend. If yarns are formed from the blend, the yarns have a relatively uniform mixture of the staple fibers also. Generally, in most preferred embodiments the individual staple fibers are opened or separated to a degree that is normal in fiber processing to make a useful fabric, such that fiber knots or stubs and other major defects due to poor opening of the staple fibers are not present in an amount that detract from the final fabric quality.

Alternatively, some woven fabrics of this invention can be made by weaving individual ends of polypyridobisimidazole fiber staple yarns with individual ends of polybenzobisoxazole fiber staple yarns. This can be achieved in any number of ways, such as plying the two different staple yarns together or by weaving a portion of one type of staple fiber in the warp and another type of staple fiber in the fill.

Alternatively, some woven fabrics of this invention can be made from multifilament continuous yarns which are either a mixture of different filaments, or as indicated above for different staple yarns, are woven from individual ends of different multifilament yarns.

This invention also relates to a method of producing a flame-resistant garment having an inner thermal lining, a liquid barrier, and an outer shell fabric by incorporating into the garment an outer shell fabric comprising 5 to 50 parts by weight of a polypyridobisimidazole fiber having an inherent viscosity of greater than 20 dl/g and 50 to 95 parts by weight of a polybenzobisoxazole fiber. In some preferred embodiments, the polypyridobisimidazole fiber comprises poly[2,6-diimidazo[4,5-b:4,5-e]-pyridinylene-1,4(2,5-dihydroxy)phenylene).

The invention is illustrated by, but is not intended to be limited by the following examples.

EXAMPLES

Example 1

A thermal protective and durable fabric is prepared having in the both warp and fill of ring spun yarns of intimate blends of polybenzobisoxazole staple fiber, polypyridobisimidazole and antistatic fiber. The polybenzobisoxazole staple fiber is available from Toyobo is known under the trademark Zylon®; the polypyridobisimidazole staple fiber is made from PIPD polymer and is marketed by Magellan Systems International under the trademark M5® fiber; and the antistatic staple fiber has a nylon sheath and carbon core and is known as P-140 nylon fiber, available from Invista.

A picker blend sliver of 38 wt. % of polypyridobisimidazole fiber, 60% of polybenzobisoxazole fiber, and 2 wt. % of antistatic fiber is prepared and processed by the conventional cotton system equipment and is then spun into a spun staple yarn having twist multiplier 4.0 and a single yarn size of about 21 tex (28 cotton count) using a ring spinning frame. Two single yarns are then plied on a plying machine to make a two-ply yarn. Using a similar process and the same twist and blend ratio, a 24 tex (24 cotton count) yarn is made for use as a fill yarn. As before, two of these single yarns are plied to form a two-ply yarn.

The polybenzobisoxazole/polypyridobisimidazole/antistatic blend yarns are then used as the warp and fill yarns and are woven into a fabric on a shuttle loom, making a greige fabric having a 2×1 twill weave and a construction of 26 ends×17 picks per cm (72 ends×52 picks per inch), and a basis weight of about 215 g/m$^2$ (6.5 oz/yd$^2$). The greige twill fabric is then scoured in hot water and is dried under low tension. The scoured fabric is then jet dyed using basic dye. The finished fabric has a basis weight of about 231 g/m2 (7 oz/yd$^2$).

The finished fabric is then used as an outershell fabric for a three-layer composite fabric that also includes a moisture barrier and a thermal liner. The moisture barrier is Goretex (0.5-0.8 oz/yd2) with a nonwoven MPD-I/PPD-T fiber substrate (2.7 oz/yd2) and thermal liner is three spunlaced 1.5 oz/yd2 sheets quilted to a 3.2 oz/yd2 MPD-I staple fiber scrim. Protective garments such as fireman turnout coats are then made from the composite fabric.

Example 2

Alternatively, the finished fabric of Example 1 is made into protective articles, including garments, by cutting the fabric into fabric shapes per a pattern and sewing the shapes together to form a protective coverall for use as protective apparel in industry Likewise, the fabric is cut into fabric shapes and the shapes sewn together to form a protective apparel combination comprising a protective shirt and a pair of protective pants. If desired, the fabric is cut and sewn to form other protective apparel components such as hoods, sleeves, and aprons.

All patents and publications disclosed herein are incorporated by reference in their entirety.

What is claimed:

1. A flame-resistant garment having an outer shell fabric comprising: 5 to 50 parts by weight of a polypyridobisimidazole fiber having an inherent viscosity of greater than 20 dl/g and
   50 to 95 parts by weight of a polybenzobisoxazole fiber.
2. The flame-resistant garment of claim 1 where the polypyridobisimidazole fiber has an inherent viscosity of greater than 25 dl/g.
3. The flame-resistant garment of claim 1 where the polypyridobisimidazole fiber has an inherent viscosity of greater than 28 dl/g.
4. The flame-resistant garment of claim 1 comprising 5 to 25 parts by weight of a polypyridobisimidazole fiber, and 75 to 95 parts by weight of a polybenzobisoxazole fiber.
5. The flame-resistant garment of claim 1 where the polypyridobisimidazole and polybenzobisoxazole fibers are present as staple fibers.
6. The flame-resistant garment of claim 1 where the polypyridobisimidazole is poly[2,6-diimidazo[4,5-b:4,5-e]-pyridinylene-1,4(2,5-dihydroxy)phenylene).
7. The flame-resistant garment of claim 1 where the polybenzobisoxazole has repeat units of the formula:

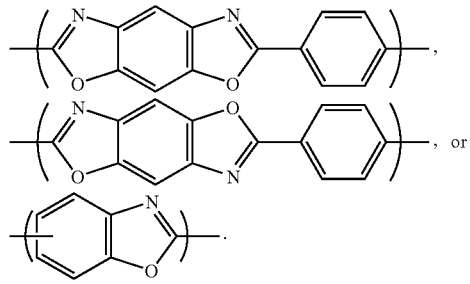

8. The flame-resistant garment of claim 1 comprising:
   a) 5 to 25 parts by weight of a polypridobisimidazole fiber, and
   b) 75 to 95 parts by weight of a polybenzobisoxazole fiber.
9. The flame-resistant garment of claim 1 where the polypyridobisimidazole and polybenzobisoxazole fibers are present as continuous filaments.

10. A flame-resistant garment comprising in order
    a) an inner thermal lining,
    b) a liquid barrier, and
    c) an outer shell fabric,
    the outer shell fabric comprising:
       5 to 50 parts by weight of a polypyridobisimidazole fiber having an inherent viscosity of greater than 20 dl/g and
       50 to 95 parts by weight of a polybenzobisoxazole fiber.
11. The flame-resistant garment of claim 10 where the polypyridobisimidazole fiber has an inherent viscosity of greater than 25 dl/g.
12. The flame-resistant garment of claim 10 where the polypyridobisimidazole fiber has an inherent viscosity of greater than 28 dl/g.
13. The flame-resistant garment of claim 10 where the outer shell fabric comprises:
    5 to 25 parts by weight of a polypyridobisimidazole fiber, and
    75 to 95 parts by weight of a polybenzobisoxazole fiber.
14. The flame-resistant garment of claim 10 where the polypyridobisimidazole and polybenzobisoxazole fibers are present as staple fibers.
15. The flame-resistant garment of claim 10 where the polypyridobisimidazole is poly[2,6-diimidazo[4,5-b:4,5-e]-pyridinylene-1,4(2,5-dihydroxy)phenylene).
16. The flame-resistant garment of claim 10 where the polybenzobisoxazole has repeat units of the formula:

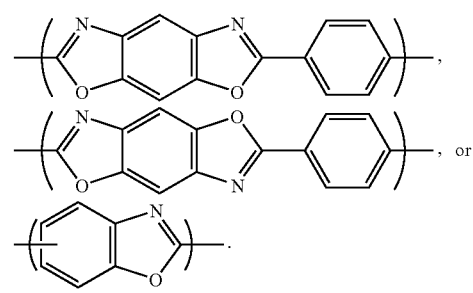

17. The flame-resistant garment of claim 10 comprising:
    a) 5 to 25 parts by weight of a polypridobisimidazole fiber, and
    b) 75 to 95 parts by weight of a polybenzobisoxazole fiber.
18. The flame-resistant garment of claim 10 where the polypyridobisimidazole and polybenzobisoxazole fibers are present as continuous filaments.
19. A method of producing a flame-resistant garment having an inner thermal lining, a liquid barrier, and an outer shell fabric, by incorporating into the garment an outer shell fabric comprising
    5 to 50 parts by weight of a polypyridobisimidazole fiber having an inherent viscosity of greater than 20 dl/g and
    50 to 95 parts by weight of a polybenzobisoxazole fiber.
20. The method of claim 19 having
    a) 5 to 25 parts by weight of a polypridobisimidazole fiber, and
    b) 75 to 95 parts by weight of a polybenzobisoxazole fiber.

* * * * *